United States Patent [19]

Takeda et al.

[11] 4,108,682
[45] Aug. 22, 1978

[54] PROCESS FOR FLUIDIZED CONTACT

[75] Inventors: Hiroo Takeda, Kawasaki; Takeshi Kanda, Sagamihara; Yutaka Oguchi, Tokyo; Naomasa Asano, Yokohama, all of Japan

[73] Assignee: Nippon Oil Company Ltd., Tokyo, Japan

[21] Appl. No.: 723,300

[22] Filed: Sep. 14, 1976

Related U.S. Application Data

[63] Continuation of Ser. No. 521,030, Nov. 5, 1974, abandoned.

[30] Foreign Application Priority Data

Nov. 7, 1973 [JP] Japan .................................. 48/124550
Sep. 25, 1974 [JP] Japan .................................. 49/109605

[51] Int. Cl.² ........................... B01J 8/20; B01J 8/22; B01J 8/34
[52] U.S. Cl. ................. 134/25 R; 23/288 S; 134/34; 201/31; 208/163; 366/101
[58] Field of Search ............... 134/7, 25 R, 34, 37; 423/659 F; 23/288 S; 261/94; 259/DIG. 17; 208/157, 163; 201/31

[56] References Cited

U.S. PATENT DOCUMENTS

| | | | |
|---|---|---|---|
| 2,533,026 | 12/1950 | Matheson | 23/288 S X |
| 2,692,192 | 10/1954 | Martin | 23/288 S X |
| 2,874,480 | 2/1959 | Todd | 201/31 X |
| 2,960,388 | 11/1960 | Johnson et al. | 23/288 S X |
| 3,398,085 | 8/1968 | Engle | 208/157 |
| 3,826,739 | 7/1974 | Kubo et al. | 134/25 R X |

OTHER PUBLICATIONS

*U.S. Stoneware Bulletin TP 54*, "Tower Packings", 1957, pp. 6-7.

*Primary Examiner*—S. Leon Bashore
*Assistant Examiner*—Marc L. Caroff
*Attorney, Agent, or Firm*—Sherman & Shalloway

[57] ABSTRACT

A fluid consisting of either a liquid or a mixture of a liquid and a gas is intimately contacted with solid particles by introducing the fluid into a contacting vessel to form a fluidized layer of the solid particles. A bed of porous packing is also placed in the contacting vessel and the upper end of the fluidized layer of solid particles is located within the porous packed bed.

10 Claims, 3 Drawing Figures

Fig. 1

PROCESS FOR FLUIDIZED CONTACT

This is a continuation of application Ser. No. 521,030, filed Nov. 5, 1974, now abandoned.

FIELD OF THE INVENTION

This invention relates to a process for fluidized contact which comprises contacting a liquid or a mixture of a liquid and a gas intimately with solid particles. More specifically, this invention relates to a process which comprises introducing a porous packing into at least a part of a contact zone to form a porous packed bed, then introducing solid particles into the lower part of the contact zone, feeding a liquid or a mixture of a liquid and a gas (to be referred to as a "fluid") from the lower part of the contact zone to form a fluidized bed of the solid particles, whereby the fluid is contacted intimately with the solid particles within the contact zone and the fluidized porous packed bed.

BACKGROUND OF THE INVENTION

Many proposals have been made to contact a liquid or a mixture of a liquid and a gas with solid particles. These proposals were made, for example, in Japanese Patent Publications Nos. 26105/67 and 29162/72. Japanese Patent Publication No. 26105/67 discloses that when solid particles are placed in a contacting vessel, and a fluid is introduced into the vessel from its lower parts, the layer of the solid particles expands from its initially packed state, and the solid particles make a substantial motion, behaving as if they were a liquid. The fluidized bed is formed usually depending upon the specific gravity of the particles, their size, the amount of the particles accomodated, and the flow rate of the fluid. Furthermore, Japanese Patent Publication No. 29162/72 contemplates the improvement of the contact between a fluid and solid particles by providing an inside cylindrical body within a contacting vessel and thus circulating the solid particles regularly.

Contacting of a fluid with solid particles utilizing fluidized beds as mentioned above is a superior expedient because it can ensure intimate and uniform contact. Furthermore, according to methods of this type, the solid particles can be exchanged while the contact between the fluid and the solid particles is continued. This is a characteristic not seen in fixed-bed methods. However, the fluidized state of solid particles is essentially dominated by the flow rate of the fluid since the fluidized bed method usually comprises introducing a fluid from the lower part of a contacting vessel, contacting the solid particles with the fluid while fluidizing the solid particles within the contact vessel, and then withdrawing the fluid from the vessel. If the flow rate of the fluid is too low, the solid particles cannot be fluidized uniformly, and therefore, the contact is non-uniform. Furthermore, when the flow rate of the fluid exceeds a certain limit, the stability of the fluidized bed is rapidly destroyed, and the solid particles flow out of the system by being carried on the fluid. Especially when the fluid contains the bubbles, the interfaces of the bubbles interfere with the solid particles, and the bubbles entrain the solid particles irrespective of the flow rate of the fluid, so that the fluidized bed becomes very unstable.

Generally, the smaller the size of solid particles, the larger is the area of contact, and the more intimate is the contact between the solid particles and a fluid, but there is a stronger tendency that the solid particles flow out of the contacting vessel. In such a case, measures are taken to feed the solid particles as a slurry in the fluid to be treated, withdrawing the solid particles as a slurry in the fluid, and allowing the slurry to stand in a separate vessel thereby to separate the solid particles from the fluid.

SUMMARY OF THE INVENTION

It is an object of this invention to remedy the defects of the known fluidized beds, and to provide a process for fluidized contact wherein solid particles can be maintained in a dense fluidized state with very good stability, and the flow-out of solid particles from the contacting vessel is reduced to a minimum.

According to this invention, there is provided a process for fluidized contact by contacting a fluid consisting of a liquid or a mixture of a liquid and a gas intimately with solid particles, which comprises forming a porous packed bed in at least a part of a contact zone of the contacting vessel by filling a porous packing, accomodating the solid particles in the lower part of the contact zone, introducing the fluid from the bottom of the contacting vessel to form a fluidized layer of the solid particles within the contact zone, and withdrawing the fluid which has made contact from the upper part of the contacting vessel, and which satisfies the following conditions:

(1) the ratio of the superficial volume occupied by the porous packed bed to the real volume of the porous packed is adjusted to at least 1.3, and
(2) the ratio of the average pore diameter of the pores of the porous packing to the average particles diameter of the solid particles is adjusted to 1.1 to 10.0.

Desirably, the upper end of the above-mentioned fluidized bed is present inside the porous packed bed. The above porous packed bed may be formed over the entire contact zone. However, in one preferred embodiment of the process of this invention, it is formed only at the upper part of the contact zone, in which case the ratio of the length of the contact zone to that of the porous packed bed is within the range of 1.5 to 5.0, preferably 2.0 to 4.0.

DETAILED DESCRIPTION OF THE INVENTION

The packing used in this invention to form a packed bed should be porous. For example, a porous sheet containing a number of small pores or a net having a suitable mesh size is made into a small object of a suitable size, and a number of such small objects are used as the porous packing in accordance with this invention. The porous Raschig ring illustrated in FIG. 3 is a preferred porous packing used in this invention.

The shape of a porous packing piece used in this invention may be any desired one, such as a cylindrical, ring-like, net-like, coil-like or star-like shape. The material for the porous packing may be any suitable material to be chosen according to the contacting conditions. Examples of the material are refractory inorganic substances such as metals, porcelain clay, silica, alumina or magnesia, and polymeric compounds such as polyethylne, polypropylene, polyvinyl chloride or polytetrafluoroethylene.

The term "contact zone", as used in the present specification and claims, denotes a zone where the fluidized contact of a fluid with solid particles is effected. In the contacting vessels shown in FIGS. 1 and 2, the areas with a length L are what are called contact zones in the present application.

Figure 1:
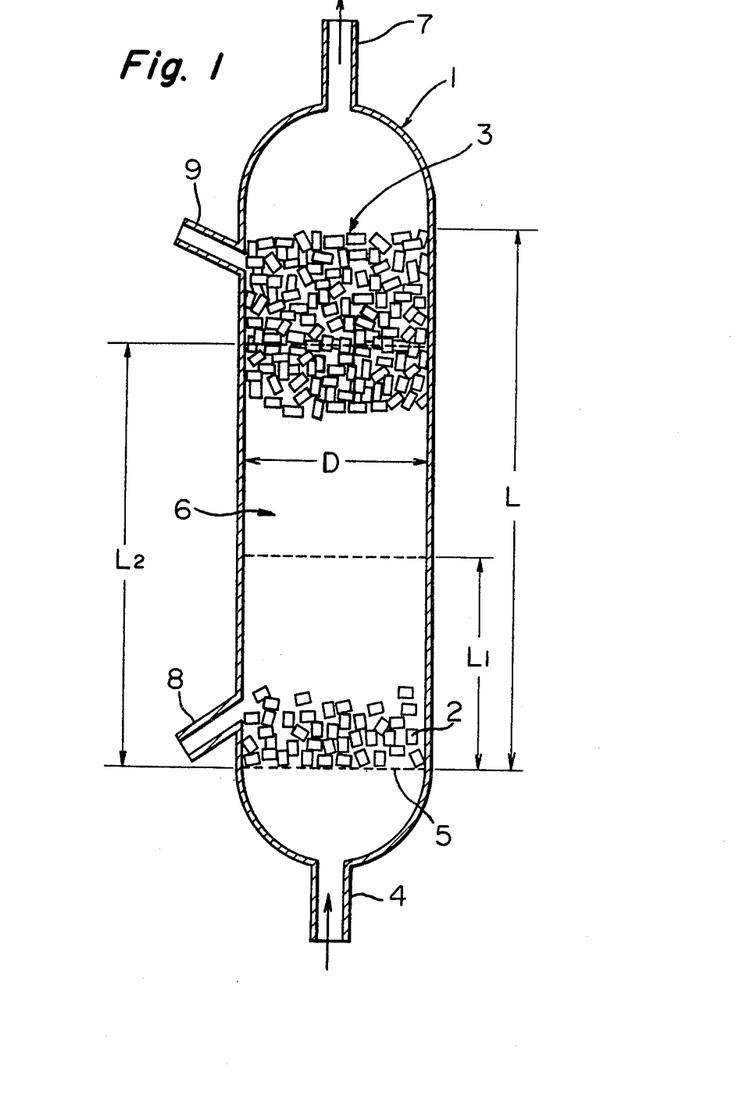
FIG. 1 is a simplified cross-sectional view of one example of a contacting vessel used in this invention in which a porous packed bed is formed over the whole of a contact zone.
Figures 2, 3:
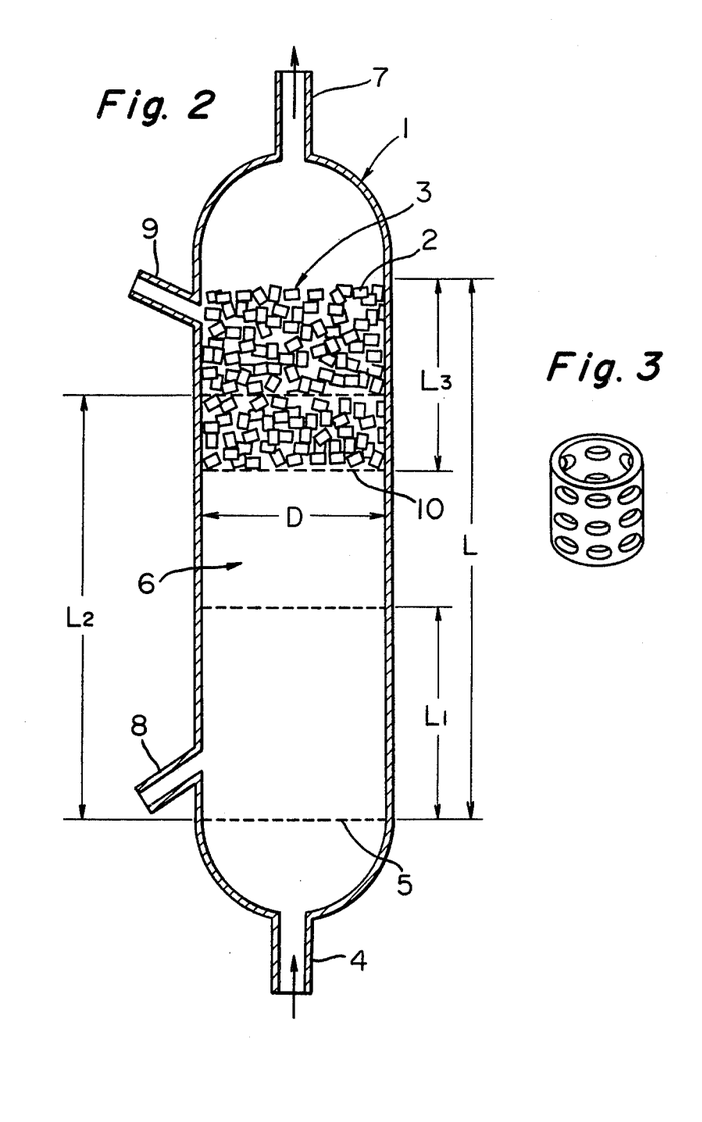
FIG. 2 is a simplfied cross-sectional view of another example of a contacting vessel used in this invention in which a porous packed bed is formed only in the upper part of a contact area.
FIG. 3 shows a porous Raschig ring as one example of the porous packing used in this invention.

The length of the porous packed bed shown in FIG. 1 is equal to L, and in FIG. 2 it is $L_3$.

The term "real volume of a porous packing", as used in the present specification and claims, denotes the volume which is occupied only by the porous packing used in this invention. On the other hand, the volume which is occupied by a geometrical contour of the packing will be referred to in this application as "the bulk volume of a packing".

This will be specifically explained with regard to the porous Raschig ring shown in FIG. 3 as an example. The "real volume of the porous packing" is then the volume which is occupied only by the porous sheet which constitutes the porous Raschig ring, and the "bulk volume of the packing" is equal to the volume of a cylinder which is a contour of the Raschig ring (the volume being $\pi r^2 h$ wherein $r$ is the outside diameter of the cylinder, and $h$ is its height).

The term "superficial volume occupied by a porous packed bed", as used in the present specification and claims, denotes the volume which is occupied in space by a porous packed bed formed as a result of filling a porous packing. This volume is equal to the sum total of the bulk volume of all the entire packing pieces and the volume of the space among adjacent packing pieces. The superficial volume occupied by a porous packed bed is $\pi/4\ D^2 L$ in FIG. 1, and $\pi/4\ D^2 L_3$ in FIG. 2. D is the inside diameter of the contacting vessel (cylindrical).

The term "average pore diameter of a porous packing", as used in the present specification and claims, is a measure of the size of the pores of the porous packing, and defined as the diameter of a circle which has an area equal to an average value of the areas of the porous packing. Where the porous packing is a Raschig ring made of a porous sheet such as shown in FIG. 3, the average area of the pores should be calculated only on the basis of the areas of the pores provided on the porous sheet as a material, and the areas of the top and bottom surfaces of the cylindrical Raschig should not be incorporated in this calculation. Likewise, when the porous packing is made of a net, the average area of the pores should be calculated only from the areas of the meshes of the net. When the porous packing used in this invention is a coily packing, the space between lines forming the coil is regarded as a pore of the porous packing, and the average pore diameter is defined as an average value of the areas of the these spaces.

The solid particles to be contacted with fluids in the present invention assume various shapes, for example, spheres, or pellets, or cylindrical shapes (in the case of extrusion-molded solid particles).

In view of this, the "average particle diameter of solid particles", as used in the present specification and claims, is regarded as a measure of an average size of the particles irrespective of their shape, and defined as the diameter of a sphere having a volume equal to the average volume of the solid particles.

The present invention is based on the discovery that when the ratio of the superficial volume occupied by a porous packed bed to the real volume of a porous packing is adjusted to at least 1.3, and the ratio of the average pore diameter of the pores of the porous packing to the average particle diameter of solid particles is adjusted to 1.1 – 10.0 in the process of contacting a fluid with solid particles by forming a fluidized bed of the solid particles in the porous packed bed formed in at least a part of a contact zone, the motion of the solid particles can be properly controlled so that the contact between the fluid and the solid particles is maintained very uniform and stable and the flow-out of the solid particles from the contacting vessel is reduced to a minimum.

The outstanding feature of the contacting method in accordance with the present invention over the conventional contacting methods using fluidized beds is that the expansion of the solid particles can be reduced to a very low level, and therefore, the concentration of the solid particles can be increased. Increasing the concentration of the solid particles is of utmost significance in reaction and chemical engineering, and results in an advantageous contact between fluids and solid particles. Furthermore, since the expansion of solid particles can be stably and markedly reduced, the solid particles scarcely flow out of the contacting vessel, and no special equipment is required to separate and collect the solid particles.

Another great feature of this invention is exhibited when a gas is present as bubbles in contacting a mixture of a liquid and the gas with solid particles. With the conventional contacting methods using fluidized beds, bubbles are not uniformly distributed but tend to gather at the central part of the contact zone. As a result, fine bubbles as initially introduced into the contacting vessel grow into large ones as a result of gathering at the central part, and rise as large bubbles in the contact zone. When bubbles grow into large sizes, a uniform contact of liquid-gas-solid particles is greatly impeded, and the solid particles are more liable to flow out of the contacting vessel as a result of adsorption to, and entraining by, the bubbles. In contast, according to the process of this invention, bubbles are dispersed uniformly and finely in the contact zone, and the tendency toward gathering at the central part can be completely prevented. Consequently, bubbles do not grow into large sizes as in the conventional methods, but a uniform contact of the bubbles with the solid particles can be achieved, and various troubles ascribable to the firm adsorption of the solid particles to the bubbles can be completely avoided.

Accordingly, the contacting process of this invention permits a far more uniform contact between fluids and solid particles than do the conventional contacting methods. In view of the fact that when a fluid contains bubbles, a uniform contact of the fluid with solid particles and the separation of the solid particles are very difficult with the conventional methods, the process of this invention is an especially advantageous process for contacting a liquid, a gas, and solid particles, and separating them.

In the present invention, the ratio of the superficial volume occupied by the porous packed bed to the real volume of the porous packing should be at least 1.3. If this ratio is less than 1.3, the fluidization of the solid particles becomes unstable, and the solid particles cannot be maintained in a proper fluidized state. Furthermore, the real volume of the porous packing in the porous packed bed becomes too large, and consequently, the effective contact space is very much reduced. When the porous packing is made of a wire net, the ratio of the superficial volume occupied by the porous packed bed to the real volume of the porous packing can be very high, and even if this ratio is more than 100, good contact can be maintained. However, in view of the strength of the metallic material, the ratio is desirably not more than 100. When the porous packing is made of a refractory such as porcelain clay or a polymeric compound, the ratio is desirably not more than 50 in view of the strength of the porous packing.

A cylindrical wire net can also be used as a porous packing in the present invention, and in this case, the ratio of the superficial volume occupied by the porous packed bed to the real volume of the porous packing can be varied over a wide range by changing the diameter of the cylinder while the real volume of the packing remains unchanged. It has been found however that if the diameter of the cylinder is increased too much, the bulk volume of the packing becomes too large for the space among adjacent packing pieces, and this adversely affects the flow of the solid particles. Thus, it is not desirable in such a case that the total bulk volume of the packing in the packed bed extremely differs from the total space among adjoining packing pieces.

Furthermore, in the present invention, it is necessary that the ratio of the average pore diameter of the pores of a porous packing to the average particle diameter of solid particles should be within the range of 1.1 to 10.0, preferably 1.5 to 5.0. If this ratio is less than 1.1, it is difficult for the solid particles to move freely through the pores of the porous packing, and a uniform fluidization of the solid particles within the contacting vessel and the porous packed layer in the upper part of the contacting vessel cannot be maintained. On the other hand, if this ratio exceeds 10.0, the action of the porous packing to control the motion of the solid particles is reduced, and the desired fluidized state cannot be achieved, and consequently, the flow-out of the solid particles from the contacting vessel cannot be prevented.

The process of this invention should be operated so that the upper end of a layer of expanded solid particles remains within the porous packed bed. When the upper end of the solid particle layer rises beyond the upper end of the fluidized porous packed bed, the solid particles are undesirably entrained by the fluid.

According to a very preferred embodiment of the process of this invention, the porous packed bed is formed only in the upper part of the contact zone as shown in FIG. 2, and no packed bed is formed in the lower part of the contact zone. In this case, the upper end of a fluidized bed of the solid particles is usually present inside the porous packed bed at the upper portion, but for the reason given above, operation should be performed so that the upper end of the fluidized layer does not rise beyond the upper end of the porous packed bed.

The advantage of this embodiment is that an effective space for contact between solid particles and fluids can be increased in the contact zone, and the concentration of the solid particles within the contact zone can be further increased. However, in this embodiment, the ratio of the length of the contact zone to that of the porous packed bed (in FIG. 2, this ratio is $L:L_3$) should be within the range of 1.5 to 5.0, preferably within the range of 2.0 to 4.0. If this ratio is less than 1.5, the effective contact space within the contacting vessel is reduced to too narrow a space of contact between the solid particles and the fluid. If, on the other hand, this ratio exceeds 5.0, the length of the porous packed bed becomes shorter, the action of the porous packing to control the motion of the solid particles is reduced, thus preventing an effective contact of the fluid with the solid particles, and especially when the fluid contains a gas, markedly reducing the dispersing effect of the gas.

Desirably, the average particle diameter of the solid particles used in this invention is usually 0.1 to 20.0 mm. It is also desirable that the true specific gravity of the solid particles is 1.20 to 8.00, and its apparent specific gravity is 0.10 to 2.00.

When the porous packed bed is formed in substantially the whole of the contact zone, it is desirable to adjust the ratio of the length (L) of the porous packed bed to the inside diameter (D) of the contacting vessel (L/D) to 3.0 – 15.0. When the porous packed bed is formed only in the upper part of the contact zone in order to increase the effective contact space in the contact zone, the ratio of the length ($L_3$) of the porous packed bed to the inside diameter (D) of the contacting vessel ($L_3/D$) is desirably adjusted to 1.0-5.0.

The amount of the solid particles to be fed into the contact zone desirably satisfies the following relation.

$$L_1/L=0.10\text{-}0.70, \text{ preferably } L_1/L=0.20\text{-}0.60$$
$$L_2/L<1.0, \text{ preferably } L_2/L=0.3\text{-}0.9 \qquad (1)$$

$$L_2/L_1=1.1\text{-}4.0, \text{ preferably } L_2/L_1=1.1\text{-}2.5 \qquad (2)$$

wherein L is the length of the contact zone; $L_1$ is the height of a layer of solid particles when it is allowed to stand; and $L_2$ is the height of a fluidized bed of solid particles when they are in fluidization.

The process of this invention should desirably be performed so that the following conditions are satisfied:

$$U_{fl} > U_l > 12.0 \text{ (cm/sec)} \qquad (3)$$

$$0 > U_g > 8.0 \text{ (cm/sec)} \qquad (4)$$

wherein $U_l$ is the superficial liquid velocity (based on the empty cross-section of the reactor) in the contact zone; $U_{gl}$ is the superficial gas velocity (based on the empty cross-section of the reactor) in the contact zone; and $U_{fl}$ is the minimum fluidization velocity of solid particles caused by the liquid.

In other words, when solid particles are brought into contact only with a liquid, the process should desirably be performed so as to satisfy the formula (3), and when contacting solid particles with a mixture of a liquid and a gas, the process should desirably be performed so as to satisfy both of the formulas (3) and (4). More desirably, the operation is carried out so as to satisfy the following relation:

$$2.0(\text{cm/sec}) < U_l < 6.0 \text{ (cm/sec)}$$
$$0 < U_g < 4.0 \text{ (cm/sec)} \qquad (5)$$

In the porous packed bed, the porous packing can be filled either regularly or irregularly, but generally, it is preferred to fill the porous packing somewhat irregularly.

In order to describe the present invention in further details, one specific embodiment involving a hydrodesulfurization reaction will be described below by referring to the accompanying drawings. It should be understood however that this description does not in any way limit the present invention.

FIG. 1 shows a contacting vessel in which a porous packed bed is formed in substantially the whole of the contact zone. A porous packing 2 is placed onto a porous support plate 5 (this support plate also acts as a dispersing plate) of a contacting vessel 1 having a cylindrical shape (with an inside diameter D), thereby to form a porous packed bed 3. In FIG. 1, the porous packing 2 is shown only at the upper and lower portions of the porous packed bed 3 for easy understanding. Actually, however, the packing pieces 2 are filled in the porous packed bed 3 in a uniform density, to form the porous packed bed having a height L. In this case, the porous packed bed 3 is substantially the same as contact zone 6, and the length of the contact zone 6 is equal to L.

Then, a fluid (a petroleum-type hydrocarbon, for example, a heavy oil) and solid particles (a desulfurization catalyst) to be contacted are placed in the lower part of the contact zone. (The solid particles are not shown.) The length $L_1$ shown in FIG. 1 is the height of the solid particles when they are allowed to stand. The fluid (heavy oil) is introduced into the contacting vessel 1 through a pipe 4, passes through the dispersing plate 5, and enters the contact zone 6 accomodating the solid particles. By the flowing of this fluid, the solid particles are fluidized, and as a result, a layer of the solid particles expands. In FIG. 1, the height $L_2$ is the height of the layer of the solid particles in the fluidized state. In other words, when the solid particles are in the stationary state, the upper end of the layer of the solid particles are at the height of $L_1$, but as a result of fluidization, it rises to the height of $L_2$.

Although the solid particles are fluidized and expand, the factor of expansion of the solid particles can be maintained at a markedly low level as compared with the fluidization of solid particles in a fluidized bed containing no porous packing. In other words, the porous packing used in this invention has an action of controlling the flowing of solid particles, and as a result, a dense fluidized bed of solid particles can be formed by the process of this invention. The fluid (heavy oil) to be treated which has thus contacted with the solid particles in the contact zone 6 leaves the contacting vessel 1 through a pipe 7. When the solid particles are degraded, they are withdrawn from a pipe 8, and fresh solid particles are introduced through a pipe 9. In this case, the withdrawal and introduction of the solid particles can be performed without varying the flow rate of the fluid. This operation hardly leads to changes in the fluidization conditions.

FIG. 2 shows the same contacting vessel 1 as in FIG. 1 except that the porous packed bed 3 is formed only in the upper part of the contact zone 6, and no porous packing is present in the lower part of the contact zone 6. In this embodiment, the porous packing is placed on a support plate (wire net) 10 provided on the upper part of the contact zone to form a porous packed bed having a height of $L_3$. As in FIG. 1, a fluid is introduced into the contacting vessel 1 through pipe 4, passes the dispersing plate 5, and enters the contact zone 6 to fluidize the solid particles (not shown) held on the dispersing plate 5. Since the porous packing does not exist in the lower part of the contact zone 6, the effective space capable of being utilized for a contact of the fluid with the solid particles is larger than in the case of FIG. 1.

The new contacting method of this invention can be applied to various processes, for example, physical treatments such as absorption, drying, adsorption, desorption, or washing, and chemical treatments such as oxidation, reduction, decomposition, polymerization or hydration, especially to the isomerization, dehydrogenation, reforming, or alkylation of hydrocarbons, or to the hydrogenation treatments thereof, such as hydrogenative decomposition, hydrogenation, or hydrodesulfurization.

The following Examples illustrate the present invention.

Examples 1 to 4 show the results of experiments which were performed by using a contacting vessel in which a porous packed bed was formed in the whole of the contact zone, and Examples 5 to 8 show the results of experiments which were performed by using a contacting vessel in which a porous packed bed was formed only in the upper part of the contact zone.

EXAMPLE 1

Experiment was performed under the conditions shown in Table 1 using the same type of equipment as shown in FIG. 1.

Table 1

| | |
|---|---|
| Dimension of the contacting vessel | Height 200 cm, diameter 10 cm |
| Porous packing (wire net) | Material, stainless steel (SUS 27); size 15 mm (diameter) × 15 mm (height); mesh 2.0 mm × 2.0 mm; thickness of the wire, 0.5 mm in diameter. |
| Solid particles | Particles of a Co-No catalyst on a silica-alumina carrier; spherical with a diameter of 0.9 mm; true specific gravity 3.22. |
| Properties of fluid | Liquid (kerosene) Density 0.783 g/cc (20° C.) Viscosity 1.28 × $10^{-2}$(g/cm.sec.) (20° C) Gas ($N_2$Gas) Density 1.165 × $10^{-3}$(g/cc) (20° C.) Viscosity 1.75 × $10^{-4}$(g/cm.sec.) (20° C) |
| State of packing | Height (L) of the porous packed bed 80 cm; Height ($L_1$) of the solid particle layer 30 cm; the ratio of the superficial space occupied by the porous packed bed to the real volume of the packing = 21.5; the ratio of the average pore diameter of the porous packing to the average diameter of solid particles = 2.22 |

The experiment was conducted under the above conditions while introducing the liquid at a superficial velocity of 4.0 cm/sec. and the gas ($N_2$ gas) at a superficial velocity of 1.0 cm/sec. The expansion factor of the solid particles could be reduced to below 2.0, and the fluidized state was very uniform. No solid particle flowed out of the contacting vessel.

When the above experiment was conducted without using the porous packing, the expansion factor of the solid particles increased to above 3.0. The amount of the solid particles entrained in the gas was as much as 5% by volume, and gas-liquid-solid separation is difficult. Then, great amounts of the solid particles flowed out of the contacting vessel.

The above experimental results show that the contacting process in accordance with this invention is superior.

EXAMPLE 2

Experiment was performed under the conditions shown in Table 2 using the same equipment as in Example 1.

Table 2

| | |
|---|---|
| Dimension of the contacting vessel | Height 500 cm, diameter 28.0 cm |
| Porous packing (a cylinderical shape with 4 pores) | Material, stainless steel (SUS 27); dimension 15 mm (diameter) × 15 mm height, thickness 1.0 mm, pore diameter 4.0 mm |
| Solid particles | Particles of a Co-Mo catalyst on the silica-alumina carrier, spherical with a diameter of 1.2 mm, true specific gravity 3,20 |
| Properties of fluid | Liquid (lubricant) Density 0.854(g/cc) (20° C.) Viscosity 1.28 (g/cm.sec.) (20° C.) Gas ($H_2$ gas) Density $0.089 \times 10^{-3}$ (g/cc) (20° C.) Viscosity $8.0 \times 10^{-5}$ (g/cm.sec.) (20° C.) |
| State of packing | Height (L) of the porous packed bed 490 cm; the height ($L_1$) of the solid particle layer 320 cm; the ratio of the superficial volume occupied by the porous packed bed to the real volume of the packing = 8.1; the ratio of the average pore diameter of the porous packing to the average particle diameter of the solid particle = 3.33 |

The experiment was conducted under the above conditions while introducing the liquid at a superficial velocity of 12.0 cm/sec. and the $H_2$ gas at a superficial velocity of 3.1 cm/sec. The expansion factor of the solid particles could be reduced to below 1.4, and the fluidized state was very uniform. The amount of the solid particles which flowed out of the contacting vessel was only less than 0.001% by volume, which could be neglected.

In spite of the fact that the superficial velocity of the liquid in this experiment was very severe for the operating range of the present invention, very good results were obtained. This demonstrates the superiority of the present invention.

When the above experiment was conducted without using the porous packing, the expansion factor of the solid particles increased to more than 3.5, and gas-liquid-solid separation became difficult. The amount of the solid particles entrained by the gas reacted was as much as 8% by volume.

EXAMPLE 3

A porous packing was filled to a height of 250 cm in a contacting vessel with a height of 300 cm and a diameter of 40 cm. The porous packing was a Raschig ring made of porcelain and having a diameter of 25 mm, height of 25 mm and a thickness of 3 mm with 32 pores each having a diameter of 4 mm.

Spherical solid particles of molecular sieve with an average diameter of 1 mm, a true specific gravity of 2.20, and an apparent specific gravity of 0.65 were introduced into the porous packed layer to a height of 90 cm. Naphtha containing 30 ppm of water was contacted with the molecular sieve particles in order to remove the water.

The superficial velocity of the naphtha was adjusted to 2.0 cm/sec. and 5.0 cm/sec. under such a condition that the ratio of the superficial volume occupied by the porous packed bed to the real volume of the porous packing was adjusted to 4, and the ratio of the average pore diameter of the porous packing to the average particle diameter of the solid particles, to 4. In any case, the fluidized state was very uniform, and the molecular sieve particles did not at all flow out.

EXAMPLE 4

A porous packing was placed to a height of 400 cm in a contacting vessel having a height of 550 cm and a diameter of 28 cm. The porous packing was a Raschig ring made of porcelain and having a diameter of 25 mm, a height of 25 mm and a thickness of 3 mm with 32 pores with a diameter of 4 mm. Spherical solid particles of molecular sieve having an average particle diameter of 1.5 mm, a true specific gravity of 2.20 and an apparent specific gravity of 0.65 were placed to a height of 200 cm in the porous packed bed. Naphtha containing 30 ppm of moisture and hydrogen containing 25 ppm of moisture were fed as fluids, and contacted with the molecular sieve particles in order to remove the moisture. The ratio of the superficial volume occupied by the porous packed layer to the real volume of the porous packing was adjusted to 4, and ratio of the average pore diameter of the porous packing to the average particle diameter of the solid particles, to 4. The superficial velocity of the naphtha was adjusted to 2.0 cm/sec. and 5.0 cm/sec., respectively, and the superficial velocity of the hydrogen gas to 0.5 cm/sec., and 2.0 cm/sec., respectively. As a result, it was confirmed that the hydrogen bubbles were dispersed very finely, and the molecular sieve particles did not flow out of the contacting vessel.

EXAMPLE 5

Experiment was performed under the conditions shown in Table 3 using the same equipment as illustrated in FIG. 2.

Table 3

| | |
|---|---|
| Dimension of the contacting vessel | Height 180 cm, diameter 8.5 cm |
| Porous packing (wire net) | Material, stainless steel (SUS 27); dimension 15 mm (diameter) × 15 mm(height), mesh 1.5 mm × 1.5 mm thickness of the wire net 0.5 mm in diameter |
| Solid particles | Particles of a Co-Mo catalyst on a silica-alumina carrier; spherical with a diameter of 0.65 mm; true specific gravity 3,29 |
| Properties of the fluids | Liquid (kerosene) Density 0.783 g/cc (20° C.) Viscosity $1.28 \times 10^{-2}$(g/cm.sec.)20° C. Gas ($N_2$ gas) Density $1.165 \times 10^{-3}$ (g/cc) 20° C. Viscosity $1.75 \times 10^{-4}$(g/cm.sec.)20° C. |
| State of packing | Height ($L_3$) of the porous packed layer 38 cm; the height ($L_1$) of the solid particle layer 57 cm; the ratio of the superficial volume occupied by the porous packed bed to the real volume of the porous packing= 20.7; the ratio of the average pore diameter of the porous packing to the average particle diameter of the solid particle = 20.7 |

The experiment was conducted under the conditions shown in Table 3 while introducing the liquid at a superficial velocity of 3.5 cm/sec. and the gas ($N_2$ gas) at a superficial velocity of 1.0 cm/sec. The expansion factor of the solid particles could be reduced to below 1.4. The fluidized state was very uniform, and the solid particles did not flow out of the contacting vessel.

When the above experiment was performed without using the porous packing, the expansion factor of the solid particles reached more than 2.5, and the amount of the solid particles entrained by the gas was great (8% by volume). Gas-liquid-solid separation was difficult, and great amounts of the solid particles flowed out of the contacting vessel.

The above experimental results can demonstrate the superiority of the contacting process of this invention.

EXAMPLE 6

Experiment was performed under the conditions shown in Table 4 using the same equipment as illustrated in FIG. 2.

Table 4

| Dimension of the contacting vessel | Height 500 cm, diameter 28.0 cm |
|---|---|
| Porous packing (cylinder with 8 pores) | Material, stainless steel (SUS 27); dimension 20 mm (diameter) × 20 mm (height), thickness 1.0 mm; pore diameter 1.8 mm |
| Solid particles | Particles of a Co-Mo catalyst on a silica-alumina carrier; spherical with a diameter of 1.1 mm; true specific gravity 3.29 |
| | Liquid (lubricant oil) |
| Properties of fluids | Density 0.854(g/cc) 20° C. Viscosity 1.28 (g/cm.sec) 20° C. |
| | Gas ($H_2$ gas) |
| | Density $0.089 \times 10^{-3}$ (g/cc) Viscosity $8.0 \times 10^{-3}$(g/cm.sec.) 20° C. |
| State of packing | Height ($L_3$) of the porous packed bed 100 cm; height of the solid particle layer 120 cm; the ratio of the superficial volume occupied by the porous packing to the real volume of the porous packing = 15.0; the ratio of the average pore diameter of the porous packing to the average particle diameter of the solid particle = 1.64 |

The experiment was performed under the above-mentioned conditions while introducing the liquid at a superficial velocity of 10.0 cm/sec., and the gas ($H_2$ gas) at a superficial velocity of 3.0 cm/sec. The expansion factor of the solid particles could be reduced to below 1.5, and the fluidized state was very uniform. The amount of the solid particles which flowed out of the contacting vessel was only less than 0.001% by volume, and could be neglected.

When the above experiment was conducted without using the porous packing, the expansion factor of the solid particles increased to above 3.5. Thus, gas-liquid-solid separation became difficult, and the amount of the solid particles entrained by the gas reached as much as 8% by volume.

EXAMPLE 7

A porous packing was filled to a height of 180 cm from the bottom of a contacting vessel with a height of 300 cm and a diameter of 40 cm to form a porous packed bed having a height of 100 cm. The porous packing consisted of Raschig rings made of porcelain and each having a diameter of 25 mm, a height of 25 mm, and a thickness of 3 mm with 32 pores with a diameter of 2.0 mm.

Spherical solid particles of molecular sieve having an average diameter of 11 mm, a true specific gravity of 2.20, and an apparent specific gravity of 0.65 were placed in the contacting vessel to a height of 100 cm. Naphtha containing 50 ppm of moisture was fed as a fluid, and contacted with the molecular sieve in order to remove the moisture.

In this experiment, the superficial velocity of naphtha was adjusted to 3.0 cm/sec., and 6.0 cm/sec., respectively, and the ratio of the superficial volume occupied by the porous packed bed to the real volume of the porous packing was adjusted to 2.0, and the ratio of the average pore diameter of the porous packing to the average particle diameter of the solid particles to 24.0. In any case, the fluidized state was very uniform and the molecular sieve particles did not flow out of the contacting vessel.

EXAMPLE 8

Hydrodesulfurization was performed using a reactor of the type shown in FIG. 2, and the starting oils, catalysts, reaction conditions, and the reactor specifications shown in Tables 5, 6 and 7. The result are shown in Tables 5, 6 and 7.

In any of these three runs, the catalyst particles exhibited a very stable fluidized state, and even when the operating conditions were changed, no substantial amounts of the catalyst particles flowed out of the reactors. The oil and the hydrogen-containing gas separated well from the catalyst particles. Every 40 hours or so, the catalyst particles were exchanged without stopping the operation. The steady state of the reaction remained unchanged, and no change was seen in the state of the resulting products.

Table 5

| Properties of oils | Starting oil | Product |
|---|---|---|
| Type of starting oil | Khafji atmospheric distillation residue oil | |
| Total S content (wt. %) | 4.32 | 1.03 |
| Degree of desulfurization (%) | — | 76.0 |
| Residual carbon content (wt. %) | 12.6 | 7.16 |
| Yield (%) based on the material | — | 95.4 |
| Viscosity (cst. at 50° C) | 970.4 | 135.2 |
| Asphaltene (wt. %) | 9.80 | 4.86 |
| Vanadium (ppm) | 81 | 36 |
| Nickel (ppm) | 21 | 12 |

CATALYST

Co-Mo catalyst on a silica-alumina carrier of a spherical shape with a diameter of 0.9 mm and a true specific gravity of 3.22.

| Reaction conditions | |
|---|---|
| Temperature; | 400° C. |
| Pressure: | 150 Kg/cm$^2$.g |
| LHSV (l/hr) | 1.12 |
| Time for continuous operation | 204 hours |
| Amount of oil circulated | 100.0 (m$^3$/m$^3$) |
| Hydrogen based on oil | 953 (N m$^3$/m$^3$) |

| Porous packing (porcelain) and the dimension of the reactor | |
|---|---|
| Ratio of the superficial volume occupied by the porous packed bed to the real volume of the porous packing | 4.0 |
| Ratio of the average pore diameter of the porous packing to the average particle diameter of the catalyst particles | 2.2 |
| D | 10.0 cm |
| L/D | 10.0 |
| $L_1/L$ | 0.45 |
| $L_2/L_1$ | 1.78 |
| $L_2/L$ | 0.8 |

-continued

| Porous packing (porcelain) and the dimension of the reactor | |
|---|---|
| $L_3/D$ | 4.0 |

Table 6

| Properties of oils | Starting oil | Product |
|---|---|---|
| Type of starting oil | Iranian light atmospheric distillation residue oil | |
| Total S content (wt. %) | 2.36 | 0.47 |
| Degree of desulfurization (%) | — | 80.1 |
| Residual carbon content (wt. %) | 6.67 | 3.26 |
| Yield (%) based on the material | — | 95.5 |
| Viscosity (cst. at 50° C) | 136.9 | 63.2 |
| Asphaltene (wt.;) | 1.68 | 0.23 |
| Vanadium (ppm) | 67 | 13 |
| Nickel (ppm) | 15 | 5 |

CATALYST

Co-Mo catalyst on a silica-alumina carrier of a spherical shape with a diameter of 0.9 mm and a true specific gravity of 3.22.

| Reaction conditions | |
|---|---|
| Temperature: | 400° C |
| Pressure: | 150 Kg/cm².g |
| LHSV (l/hr) | 1.41 |
| Time for continuous operation | 260 hours |
| Amount of oil circulated | 80.0 (m³/m³) |
| Hydrogen based on oil | 1298 (N m³/m³) |

| Porous packing (porcelain) and the dimension of the reactor | |
|---|---|
| Ratio of the superficial volume occupied by the porous packed bed to the real volume of the porous packing | 21.5 |
| Ratio of the average pore diameter of the porous packing to the average particle diameter of the catalyst particles | 1.5 |
| D | 10.0 cm |
| L/D | 10.0 |
| $L_1/L$ | 0.55 |
| $L_2/L_1$ | 1.45 |
| $L_2/L$ | 0.8 |
| $L_3/D$ | 5.0 |

Table 7

| Properties of oils | Starting oil | Product |
|---|---|---|
| Type of starting oil | Arabian light vacuum distillation residue oil | |
| Total S content (wt. %) | 3.88 | 0.54 |
| Degree of desulfurization (%) | — | 86.0 |
| Residual carbon content (wt. %) | 17.14 | 7.31 |
| Yield (%) based on the material | — | 92.5 |
| Viscosity (cst. at 50° C) | 1624.6 | 593.6 |
| Asphaltene (wt. %) | 5.54 | 3.22 |
| Vanadium (ppm) | 50 | 15 |

Table 7-continued

| Properties of oils | Starting oil | Product |
|---|---|---|
| Nickel (ppm) | 14 | 8 |

CATALYST

Co—Mo catalyst on a silica-alumina carrier of a spherical shape with a diameter of 0.9 mm and a true specific gravity of 3.22.

| Reaction conditions | |
|---|---|
| Temperature: | 410° C. |
| Pressure: | 150 Kh/cm².g |
| LHSV (l/hr) | 0.63 |
| Time for continuous operation | 390 hours |
| Amount of oil circulated | 150.0 (m³/m³) |
| Hydrogen based on oil | 957 (N m³/m³) |

| Porous packing (porcelain) and the dimension of the reactor | |
|---|---|
| Ratio of the superficial volume occupied by the porous packed bed to the real volume of the porous packing | 30.0 |
| Ratio of the average pore diameter of the porous packing to the average particle diameter of the catalyst particles | 3.3 |
| D | 10.0 cm |
| L/D | 12.0 |
| $L_1/L$ | 0.50 |
| $L_2$ | |
| $L_1$ | 1.58 |
| $L_2/L$ | 0.79 |
| $L_3/D$ | 4.5 |

What we claim is:

1. A process for fluidized contact by contacting a liquid intimately with solid particles in a contacting vessel, which comprises forming a porous packed bed in at least a part of a contact zone of said contacting vessel by filling the contact zone with a porous packing, accommodating the solid particles in the lower part of the contact zone, introducing the liquid from the bottom of the contacting vessel to form a fluidized layer of solid particles within the contact zone, the upper end of the layer of the solid particles expanded by the fluidization being located within the porous packed bed, and withdrawing the liquid which has made contact from the upper part of the contacting vessel, said contact being performed under the following conditions:

(1) the ratio of superficial volume occupied by the porous packed bed to real volume of the porous packing is at least 1.3, (2) the ratio of the average pore diameter of the pores of the porous packing to the average particle diameter of the solid particles is 1.1 to 10.0, (3) $L_2/L = 0.3 - 0.9$ wherein L is the length of the contact zone extending from the bottom of the fluidized layer of solid particles to the top of the porous packed bed, and $L_2$ is the height of the fluidized layer of solid particles when they are in fluidization, and (4) $U_{fl} < U_l < 12.0$ (cm/sec.) wherein $U_l$ is the superficial liquid velocity in the contact zone based on the empty cross-section of the contacting vessel and $U_{fl}$ is the minimum fluidization velocity of solid particles caused by the liquid.

2. The process of claim 1 wherein said porous packed bed is formed in substantially the whole of said contact zone.

3. The process of claim 1 wherein said porous packed bed is formed only in the upper part of said contact zone, and the ratio of the length of the contact zone to that of the porous packed bed is within the range of 1.5 to 5.0.

4. The process of claim 1 wherein said solid particles have an average particle diameter of 0.1 to 20.0 mm.

5. The process of claim 1 wherein the following conditions are satisfied:

$$L_1/L = 0.10 - 0.70$$

$$L_2/L_1 = 1.1 - 4.0$$

wherein L is the length of the contact zone, $L_1$ is the height of the solid particle layer in the stationary state, and $L_2$ is the height of the fluidized layer when the solid particles are in the fluidized state.

6. A process for fluidized contact by contacting a mixture of a liquid and a gas intimately with solid particles in a contacting vessel, which comprises forming a porous packed bed in at least a part of a contact zone of said contacting vessel by filling the contact zone with a porous packing, accommodating the solid particles in the lower part of the contact zone, introducing the liquid and gas from the bottom of the contacting vessel to form a fluidized layer of solid particles within the contact zone, the fluidization of the solid particles being caused by the liquid, said gas being in the form of fine bubbles uniformly dispersed in the contact zone, the upper end of the layer of the solid particles expanded by the fluidization being located within the porous packed bed, and withdrawing the liquid and gas which have made contact from the upper part of the contacting vessel, said contact being performed under the following conditions:

(1) the ratio of the superficial volume occupied by the porous packed bed to real volume of the porous packing is at least 1.3, (2) the ratio of the average pore diameter of the pores of the porous packing to the average particle diameter of the solid particles is 1.1 to 10.0, (3) $L_2/L = 0.3 - 0.9$ wherein L is the length of the contact zone from the bottom of the fluidized layer of solid particles to the top of the porous packed bed, and $L_2$ is the height of the fluidized layer of solid particles when they are in fluidization, and (4) $U_{fl} < U_l < 12.0$ (cm/sec.) $0 < U_g < 8.0$ (cm/sec.) wherein $U_l$ is the superficial liquid velocity in the contact zone based on the empty cross-section of the contacting vessel, $U_g$ is the superficial gas velocity in the contact zone based on the empty cross-section of the contacting vessel, and $U_{fl}$ is the minimum fluidization velocity of solid particles caused by the liquid.

7. The process of claim 6 wherein said porous packed bed is formed in substantially the whole of said contact zone.

8. The process of claim 6 wherein said porous packed bed is formed only in the upper part of said contact zone, and the ratio of the length of the contact zone to that of the porous packed bed is within the range of 1.5 to 5.0.

9. The process of claim 6 wherein said solid particles have an average particle diameter of 0.1 to 20.0 mm.

10. The process of claim 6 wherein the following conditions are satisfied:

$$L_1/L = 0.10 - 0.70$$

$$L_2/L_1 = 1.1 - 4.0$$

wherein L is the length of the contact zone, $L_1$ is the height of the solid particle layer in the stationary state, and $L_2$ is the height of the fluidized layer when the solid particles are in the fluidized state.

* * * * *